United States Patent
Kikuta et al.

(10) Patent No.: US 9,452,739 B2
(45) Date of Patent: Sep. 27, 2016

(54) CLEANING DEVICE FOR ON-VEHICLE OPTICAL SENSOR

(71) Applicant: Asmo Co., Ltd., Shizuoka-ken (JP)

(72) Inventors: Tomoyuki Kikuta, Toyohashi (JP); Yukihiro Matsushita, Hamamatsu (JP); Keita Saito, Iwata (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 14/448,149

(22) Filed: Jul. 31, 2014

(65) Prior Publication Data

US 2015/0040953 A1 Feb. 12, 2015

(30) Foreign Application Priority Data

Aug. 12, 2013 (JP) .................... 2013-167700
May 20, 2014 (JP) .................... 2014-104406

(51) Int. Cl.
*B60S 1/56* (2006.01)
*B60S 1/52* (2006.01)

(52) U.S. Cl.
CPC ... *B60S 1/56* (2013.01); *B60S 1/52* (2013.01)

(58) Field of Classification Search
None
See application file for complete search history.

(56) References Cited

U.S. PATENT DOCUMENTS

| | | | |
|---|---|---|---|
| 3,237,866 A * | 3/1966 | Lovell ........................ 239/204 |
| 9,126,534 B2 * | 9/2015 | Snider ...................... B60R 1/00 |
| 2008/0200764 A1 | 8/2008 | Okada |
| 2009/0250533 A1 * | 10/2009 | Akiyama ................ B60S 1/58 239/284.1 |
| 2011/0073142 A1 * | 3/2011 | Hattori ................. B60S 1/0848 134/56 R |
| 2012/0117745 A1 * | 5/2012 | Hattori et al. ............ 15/250.01 |
| 2013/0028588 A1 * | 1/2013 | Suman et al. ................ 396/448 |
| 2013/0092758 A1 * | 4/2013 | Tanaka et al. ............ 239/284.1 |
| 2014/0060582 A1 * | 3/2014 | Hartranft ................ B05B 1/06 134/18 |

FOREIGN PATENT DOCUMENTS

| | | |
|---|---|---|
| JP | 2007-53448 | 3/2007 |
| JP | 2010-155484 | 7/2010 |
| WO | 2012/138455 | 10/2012 |

* cited by examiner

*Primary Examiner* — Michael Barr
*Assistant Examiner* — Cristi Tate-Sims
(74) *Attorney, Agent, or Firm* — Patterson Thuente Pedersen, P.A.

(57) ABSTRACT

An on-board optical sensor cleaning device includes an on-board camera and a discharge port. The on-board camera is mounted on a vehicle. The on-board camera includes a lens. The discharge port discharges fluid toward the lens. The discharged fluid removes foreign material collected on the lens. The lens and the discharge port are relatively movable. At least one of the lens and the discharge port is movable between a cleaning position, where the discharge port is located proximal to an image capturing range center of the on-board camera, and a non-cleaning position, where the discharge port is located farther from the image capturing range center than the cleaning position.

26 Claims, 15 Drawing Sheets

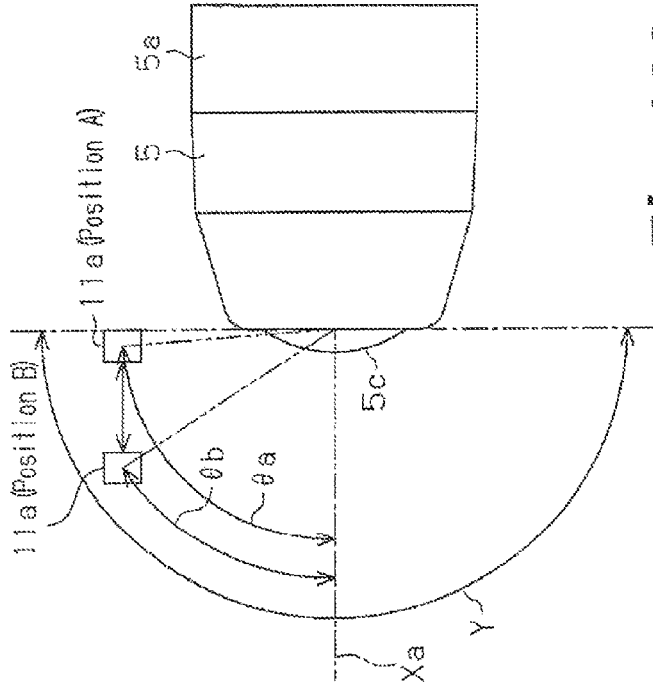
Fig. 13A
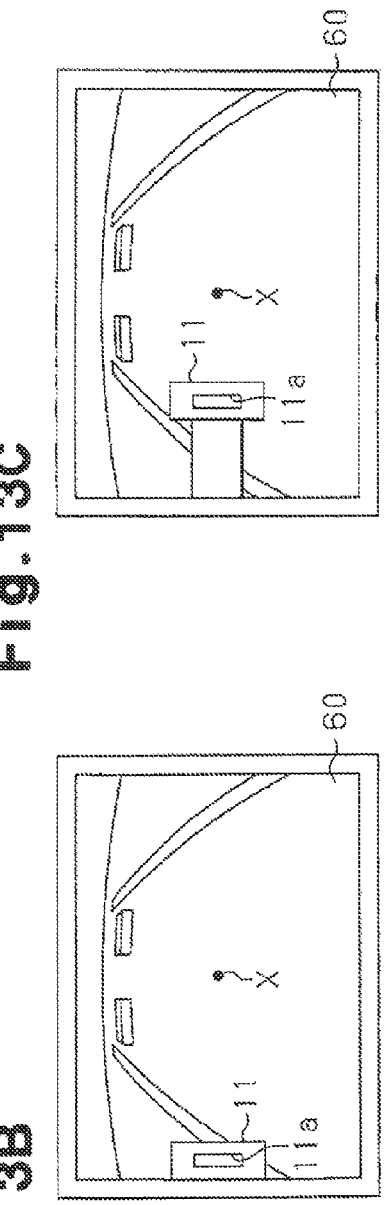
Fig. 13B
Fig. 13C

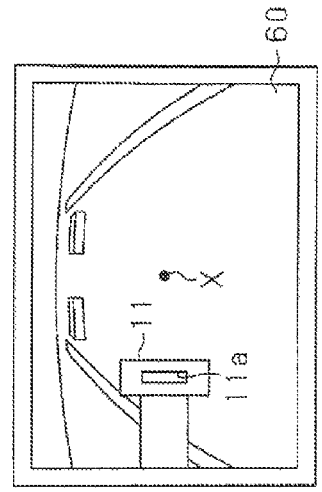
Fig.14C
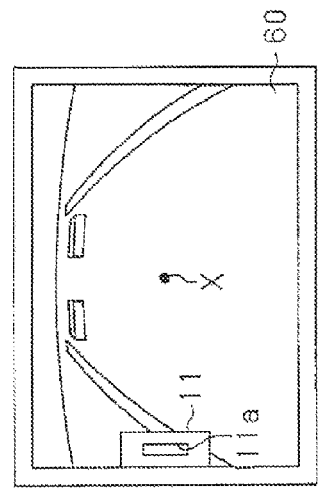
Fig.14B
Fig.14A

US 9,452,739 B2

CLEANING DEVICE FOR ON-VEHICLE OPTICAL SENSOR

BACKGROUND OF THE INVENTION

The present invention relates to an on-vehicle optical sensor cleaning device.

On-board optical sensors are now often arranged on the front or rear of vehicles to use the images captured by the on-board optical sensors. Foreign material such as mud may collect on an external image capturing surface (lens or protective glass) of such an on-board optical sensor. Thus, an on-board optical sensor cleaning device has been proposed to discharge liquid toward an external image capturing surface from a discharge port of a nozzle (refer to, for example, Japanese Laid-Open Patent Publication No. 2007-53448).

However, in an on-board optical sensor cleaning device such as that described above, the discharge port (distal portion of nozzle) may be located near the center of the image capturing range of the on-board optical sensor so that the discharge port faces the central portion of the external image capturing surface. In this case, the discharge port (distal portion of nozzle) may obstruct image capturing. This may substantially decrease the image capturing range of the on-board optical sensor in which an image can be captured.

SUMMARY OF THE INVENTION

It is an object of the present invention to provide an on-board optical sensor cleaning device that cleans an external image capturing surface without obstructing image capturing.

To achieve the above object, one aspect of the present invention is an on-board optical sensor cleaning device including an on-board optical sensor and a discharge port. The on-board optical sensor is mounted on a vehicle. The on-board optical sensor includes an external image capturing surface. The discharge port discharges fluid toward the external image capturing surface. The discharged fluid removes foreign material collected on the external image capturing surface. The external image capturing surface and the discharge port are relatively movable. At least one of the external image capturing surface and the discharge port is movable between a cleaning position, in which the discharge port is located proximal to an image capturing range center of the on-board optical sensor, and a non-cleaning position, in which the discharge port is located farther from the image capturing range center than the cleaning position.

BRIEF DESCRIPTION OF THE DRAWINGS

The invention, together with objects and advantages thereof, may best be understood by reference to the following description of the presently preferred embodiments together with the accompanying drawings in which:

FIG. 13A is a schematic diagram of an on-board optical sensor cleaning device in a further example;

FIGS. 13B and 13C are schematic views each showing a display in a further example;

FIG. 14A is a schematic diagram of an on-board optical sensor cleaning device in a further example;

FIGS. 14B and 14C are schematic views each showing a display of a further example;

DETAILED DESCRIPTION OF THE PREFERRED EMBODIMENTS

First Embodiment

A first embodiment of an on-board optical sensor cleaning device mounted on a vehicle will now be described with reference to FIGS. 1 to 5.

Figure 1A:
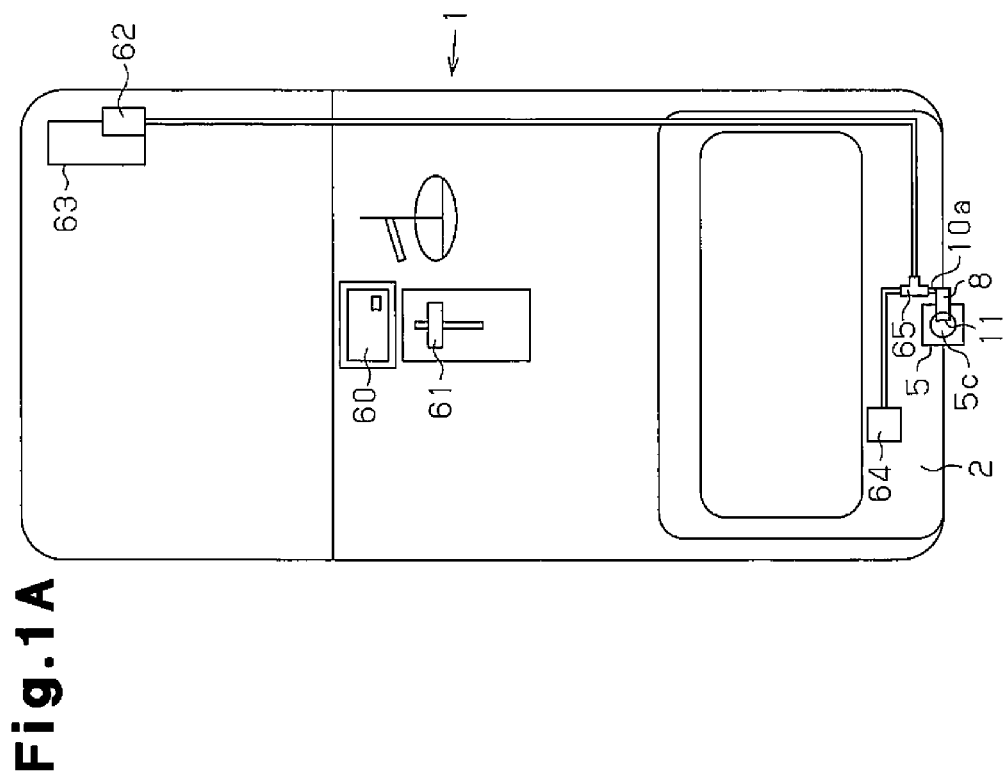
FIG. 1A is a schematic diagram of a vehicle including an on-board optical sensor cleaning device according to a first embodiment of the present invention.

As shown in FIG. 1A, the rear of a vehicle 1 includes a back door 2.

Figure 2:
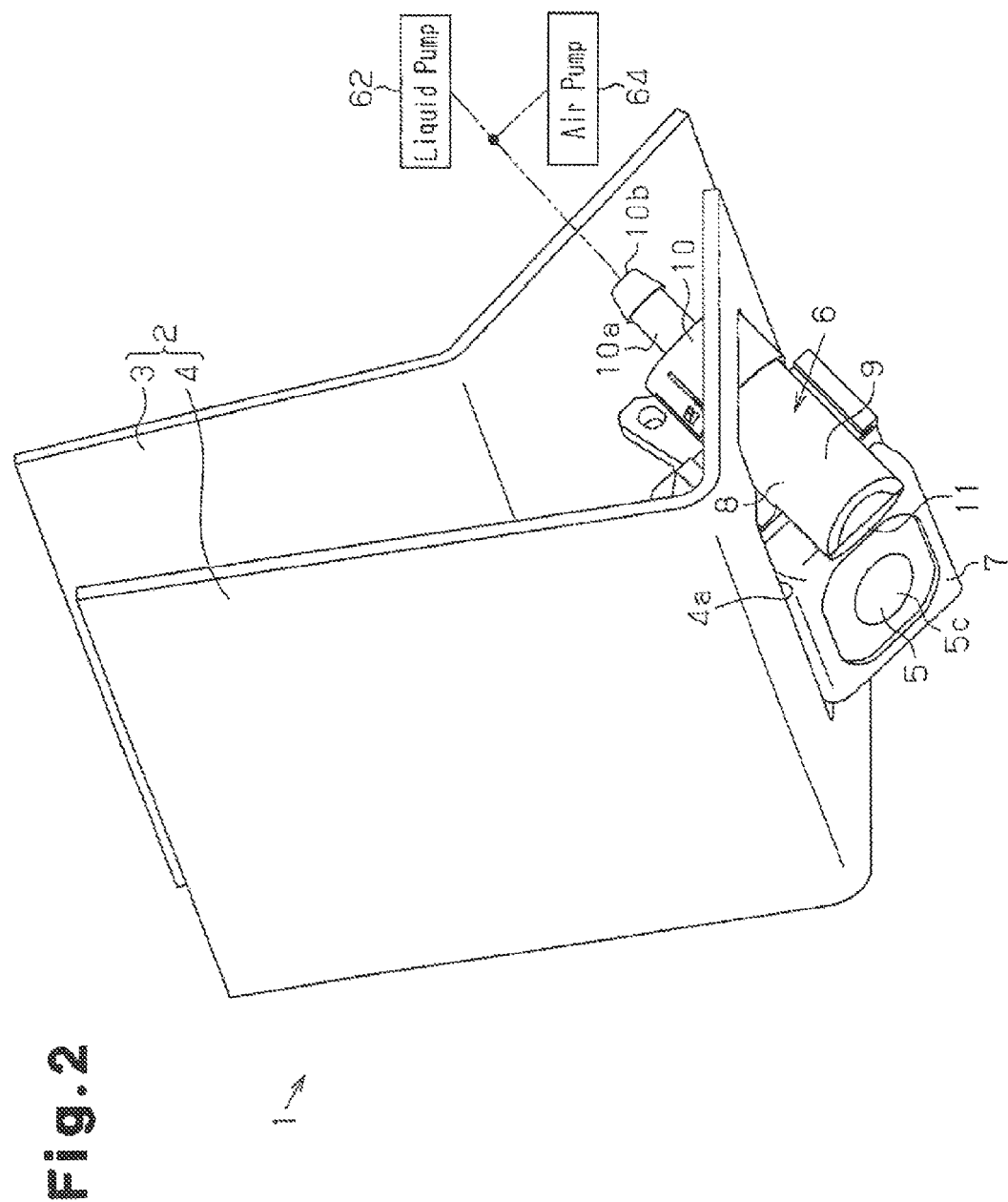
FIG. 2 is a partially schematic perspective view of the vehicle shown in FIG. 1A.

As shown in FIG. 2, the back door 2 includes a metal vehicle panel 3 and a plastic garnish 4 partially covering the vehicle panel 3. The garnish 4 includes an opening 4a that opens toward the lower side. The back door 2 includes an on-board camera 5, which serves as an on-board optical sensor, and a cleaning unit 6. A portion of the on-board camera 5 and a portion of the cleaning unit 6 are exposed from the opening 4a. The on-board camera 5 is fixed to the vehicle panel 3.

Figure 3A:
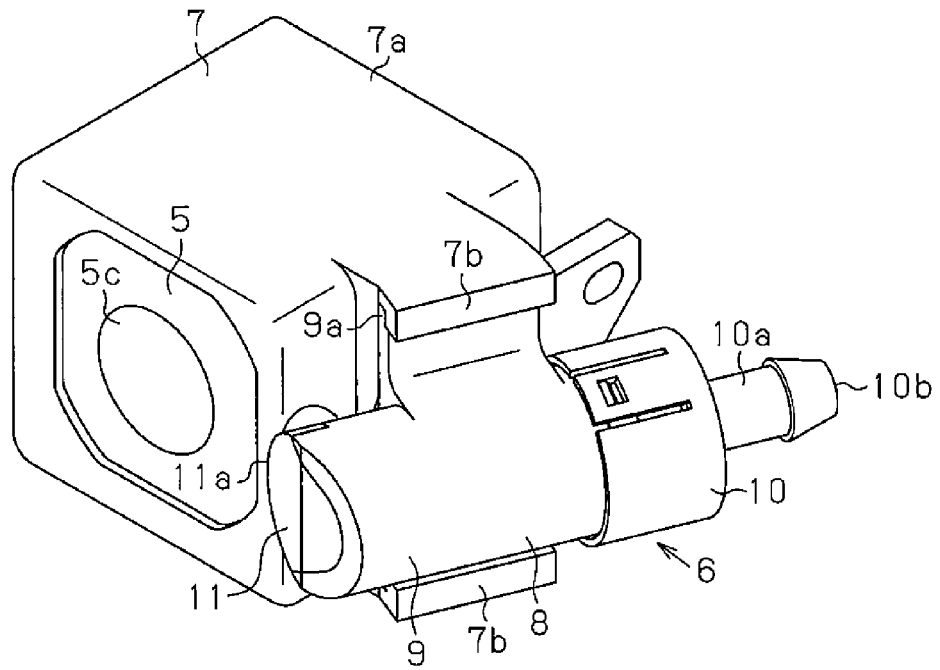
FIG. 3A is a perspective view of an on-board camera and a cleaning unit shown in FIG. 1A when the on-board camera is located at a non-cleaning position.
Figure 3B:
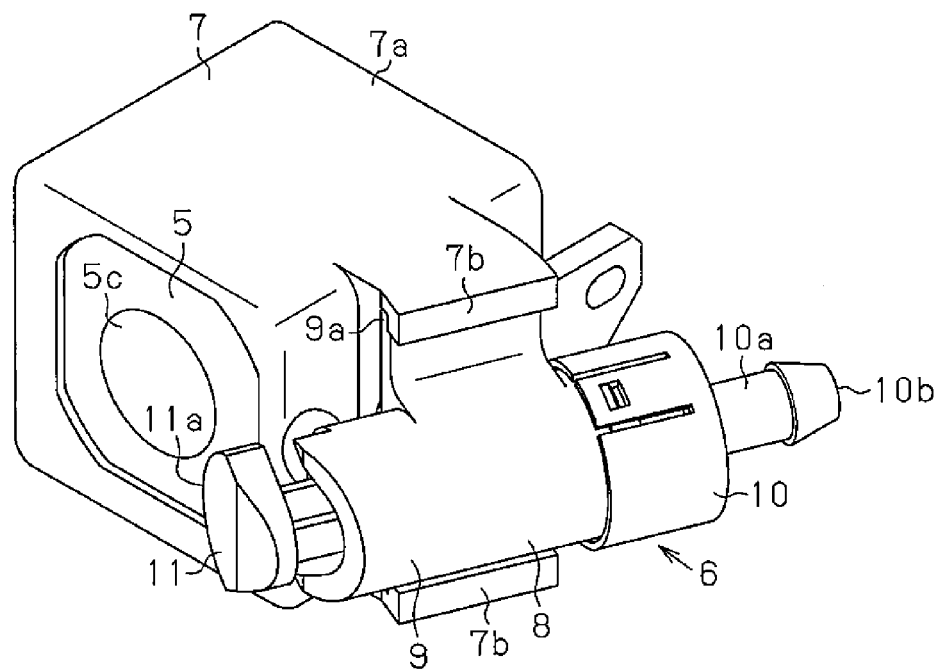
FIG. 3B is a perspective view of the on-board camera and the cleaning unit shown in FIG. 1A when the on-board camera is located at a cleaning position.
Figure 4:
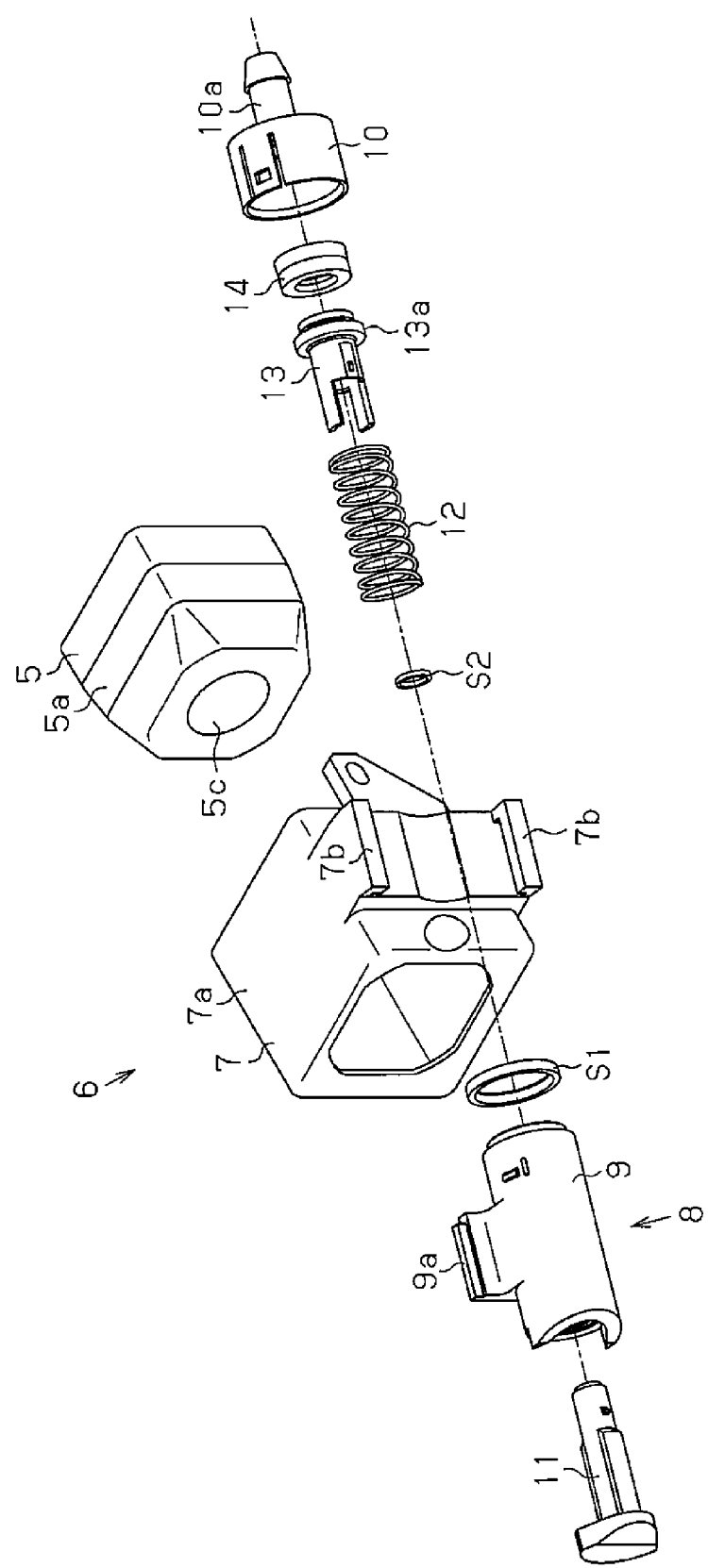
FIG. 4 is an exploded perspective view of the on-board camera and the cleaning unit shown in FIG. 3A.
Figure 5:
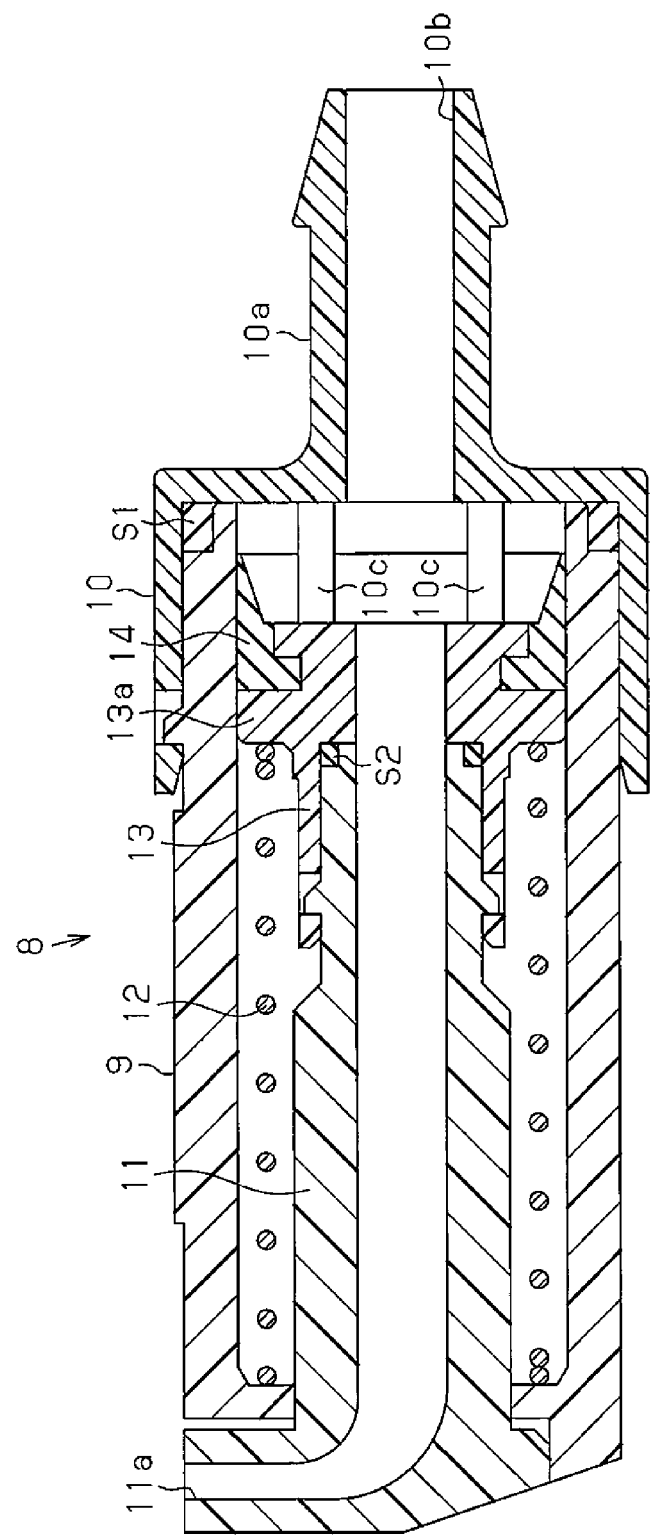
FIG. 5 is a cross-sectional view of a nozzle unit shown in FIG. 4.

As shown in FIGS. 3 to 5, the on-board camera 5 includes a generally box-shaped main body 5a, which accommodates an image capturing element (not shown), and a lens 5c, which is arranged in one surface of the main body 5a and serves as an external image capturing surface. The lens 5c is immovable relative to the vehicle 1.

Figure 1B:
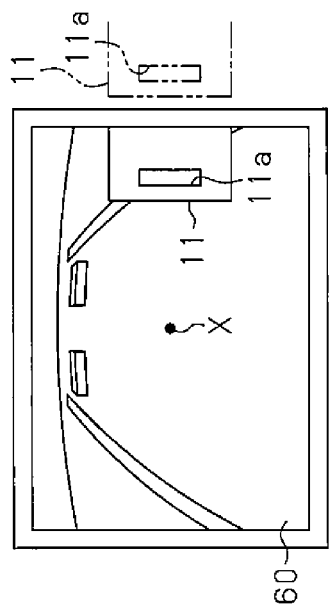
FIG. 1B is a schematic diagram of a display shown in FIG. 1A.

Referring to FIGS. 1A and 1B, for example, when a shift lever 61 of a transmission is moved to a reverse position, the on-board camera 5 transmits captured images of the rear of the vehicle 1 to a display 60, which shows the images.

As shown in FIGS. 3 to 5, the cleaning unit 6 includes a fastening member 7, which is fastened to the on-board camera 5, and a nozzle unit 8, which is fastened to the fastening member 7. The fastening member 7 includes a generally box-shaped holder 7a, which is capable of receiving the on-board camera 5. The holder 7a receives the main body 5a of the on-board camera 5. This fastens the fastening member 7 to the on-board camera 5. The fastening member 7 includes two fastened pieces 7b. Opposing surfaces of the fastened pieces 7b each include a groove. The nozzle unit 8 is coupled in removable manner to the fastened pieces 7b.

The nozzle unit 8 includes a generally tubular first case 9 and a second case 10 fitted and fixed to the basal end of the first case 9. The circumference of the first case 9 includes two fastening projections 9a (only one shown in FIGS. 3 and 4). The fastening projections 9a are fitted to the grooves of the fastened pieces 7b and coupled in a removable manner to the fastened pieces 8b. An intake tube 10a is formed at the bottom of the second case 10. The intake tube 10a projects from the bottom of the second case 10. An intake port 10b (refer to FIG. 5) is formed in the intake tube 10a in communication with the interior of the first case 9. A seal ring S1 is held between the first case 9 and the second case 10.

As shown in FIGS. 4 and 5, the nozzle unit 8 includes a movable nozzle 11 and a compression coil spring 12. The movable nozzle 11 is supported by the nozzle unit 8 to be able to move forward and rearward in order to move out of and into a distal opening of the first case 9. The compression coil spring 12 serves as a biasing member that biases the movable nozzle 11 in the rear direction (direction toward basal end of first case 9).

In detail, as shown in FIG. 5, the movable nozzle 11 is tubular and has a smaller diameter than the first case 9. Further, the distal portion of the movable nozzle 11 includes a discharge port 11a that extends sideward (direction orthogonal to longitudinal direction). As schematically shown in FIG. 1B, the discharge port 11a of the present embodiment is rectangular as viewed from the open direction. In further detail, the discharge port 11a is rectangular and elongated in a direction orthogonal to the forward and rearward directions as viewed from the open direction. A basal member 13 is fitted and fixed to the basal portion of the movable nozzle 11. A seal ring S2 is held between the movable nozzle 11 and the basal member 13. The basal member 13 includes a flange 13a extending toward the outer side in the radial direction. One end of the compression coil spring 12 is supported by the distal portion of the first case 9. The compression coil spring 12 biases the flange 13a in the rearward direction (right direction as viewed in FIG. 5) to bias the movable nozzle 11 in the rearward direction (right direction as viewed in FIG. 5). An annular seal member 14, which contacts and slides along the inner circumferential surface of the first case 9, is fitted to the basal portion of the basal member 13.

Restriction rods 10c extend from the bottom of the second case 10 in a direction opposite to the intake tube 10a. In this example, three restriction rods 10c (only two shown in FIG. 5) are formed at equal angular intervals in the circumferential direction. The restriction rods 10c contact the basal end surface of the basal member 13, which is biased by the compression coil spring 12, and restricts rearward movement of the basal member 13 (movable nozzle 11) from the position of contact.

As shown in FIGS. 1 and 2, a liquid pump 62 is connected to the intake tube 10a (intake port 10b). The liquid pump 62 of the present embodiment is capable of delivering a cleaning liquid, which serves as a fluid stored in a tank 63. The liquid pump 62 is driven to supply the nozzle unit 8 with the cleaning liquid from the intake port 10b. The liquid pump 62 is driven when, for example, a switch arranged in the passenger compartment is operated or immediately before the on-board camera 5 starts capturing images.

An air pump 64, which discharges air that is mixed with the cleaning liquid, is connected to the intake tube 10a (intake port 10b). In the present embodiment, a joint 65 is arranged in a pipe connecting the intake tube 10a and the liquid pump 62. The cleaning liquid is mixed with air in the joint 65. The air pump 64 is driven when the liquid pump 62 is driven. For example, the air pump 64 is driven whenever the liquid pump 62 is driven. Then, after the liquid pump 62 stops operating, the air pump 64 continues to operate for a predetermined time before stopping When the cleaning liquid from the intake port 10b is supplied to the interior of the movable nozzle 11, the delivering pressure of the cleaning liquid biases the basal end surface of the basal member 13 and moves the basal member 13 forward against the biasing force of the compression coil spring 12. In detail, the cleaning liquid is a fluid formed by mixing a cleaning liquid with air but will simply be referred to as the cleaning liquid hereafter.

Forward and rearward movement of the movable nozzle 11 allows for movement of the discharge port 11a between a cleaning position, which is located proximal to the image capturing range center X (refer to FIG. 1B) of the on-board camera 5, and a non-cleaning position, which is located farther from the image capturing range center X than the cleaning position. The image capturing range of the present embodiment is the range in which the on-board camera 5 (image capturing element of on-board camera 5) captures images through the lens 5c and is the range shown on the display 60.

Specifically, in the present embodiment, the non-cleaning position is set where the discharge port 11a is located outside the image capturing range of the on-board camera 5 (refer to double-dashed lines in FIG. 1B). Further, the cleaning position is set where the discharge port 11a is located in the image capturing range of the on-board camera 5. That is, when the movable nozzle 11 is moved toward the rear to a rear position (basal end surface of basal member 13 in contact with the restriction rods 10c), the discharge port 11a is located at the non-cleaning position outside the image capturing range of the on-board camera 5. When the movable nozzle 11 is moved toward the front to a front position, the discharge port 11a is located at the cleaning position inside the image capturing range. In FIG. 1B, the solid lines indicate the background shown in the display 60 and the discharge port 11a (distal portion of movable nozzle 11) located in the image capturing range. Further, the double-dashed lines schematically indicate the discharge port 11a (distal portion of movable nozzle 11) located outside the image capturing range.

In the present embodiment, the direction in which the movable nozzle 11 is able to move forward and rearward is inclined relative to the direction the lens 5c of the on-board camera 5 faces toward (image capturing axis, which is the center axis of the lens 5c). That is, when the movable nozzle 11 is moved forward to the front position, the discharge port 11a is located proximal to the image capturing axis (center axis of the lens 5c) and closer to the center of the image capturing range of the on-board camera 5. Further, the discharge port 11a is inclined so that the cleaning liquid is discharged from the discharge port 11a to the center position of the lens 5c.

Further, in the present embodiment, the movable nozzle 11 is located sideward from the on-board camera 5 in the horizontal direction so that the discharge port 11a would be located sideward from the lens 5c in the horizontal direction.

The movement and operation of the on-board optical sensor cleaning device in the present embodiment will now be described.

When the liquid pump 62 and the air pump 64 are not driven, the movable nozzle 11 is moved to the rear and located at the non-cleaning position due to the biasing force of the compression coil spring 12 (FIG. 3A). Thus, the discharge port 11a (distal portion of movable nozzle 11) is located outside the image capturing range of the on-board camera 5. As a result, if an image is captured when cleaning is not performed, the discharge port 11a (distal portion of movable nozzle 11) does not obstruct the image capturing.

When the liquid pump 62 and the air pump 64 are driven and the cleaning liquid is supplied from the intake port 10b to the nozzle unit 8, the delivery pressure of the cleaning liquid moves the movable nozzle 11 (discharge port 11a) forward to the cleaning position (refer to FIG. 3B). Further, the discharge port 11a is arranged in the image capturing range of the on-board camera 5, and the cleaning liquid is discharged from the discharge port 11a to the lens 5c. This removes foreign matter or the like from the lens 5c and performs cleaning.

The advantages of the first embodiment will now be described.

(1) The lens 5c and the discharge port 11a are movable relative to each other. In the first embodiment, the discharge port 11a is movable relative to the lens 5c. The movable nozzle 11, which includes the discharge port 11a, is movable between the cleaning position, where the discharge port 11a is located proximal to the image capturing range center X of the on-board camera 5, and a non-cleaning position, where the discharge port 11a is located farther from the image capturing range center X than the cleaning position. Thus, by allowing the movable nozzle 11 to move to the cleaning position only when performing cleaning, the lens 5c may be cleaned in a satisfactory manner without obstructing image capturing.

(2) The movable nozzle 11, which includes the discharge port 11a, is able to move forward and rearward between the cleaning position and the non-cleaning position. This reduces the area required for the movement compared to, for example, when relatively pivoting the external image capturing surface (lens 5c) and the discharge port 11a.

(3) The on-board camera 5, which includes the lens 5c, is fixed to the vehicle 1. Thus, for example, stable images can be captured. Further, the movable nozzle 11 is supported so that the discharge port 11a is able to move forward and rearward relative to the vehicle 1. Thus, the forward and rearward movements are facilitated compared to when fixing the discharge port 11a and moving the on-board camera 5 forward and rearward. Specifically, for example, a large mechanism including the on-board camera 5 would be needed to allow the external image capturing surface (lens 5c) to move forward and rearward. Compared to such a structure, when the external image capturing surface (on-board camera 5) is directly or indirectly arranged on the vehicle 1, the movable nozzle 11 may be relatively smaller and lighter. Thus, the structure for moving the movable nozzle forward and rearward facilitates the switching between the forward and rearward movements.

(4) The movable nozzle 11 is able to move forward so that the discharge port 11a approaches the lens 5c of the on-board camera 5. Thus, for example, the cleaning liquid may easily be discharged from the front, proximal to the image capturing axis (center axis of the lens 5c), to the center position of the lens 5c. Thus, the lens 5c may be cleaned in a satisfactory manner.

(5) The delivery pressure of the cleaning liquid (fluid) moves the movable nozzle 11 forward to the cleaning position. Thus, there is no need for an electric driving device or the like to move the movable nozzle 11 forward. This allows for a simplified structure.

(6) The cleaning device of the present embodiment includes the compression coil spring 12 (biasing member). The biasing force of the compression coil spring 12 moves the movable nozzle 11 rearward to the non-cleaning position. Thus, there is no need for an electric driving device or the like to move the movable nozzle 11 rearward. This allows for a simplified structure.

(7) The cleaning device of the present embodiment further includes a nozzle unit 8, which supports the movable nozzle 11 to be able to move forward and rearward. The nozzle unit 8 is coupled in a removable manner to the vehicle 1. Thus, for example, when the movable nozzle 11 fails to move forward and rearward, the nozzle unit 8 may easily be removed and replaced with a new nozzle unit 8.

(8) The discharge port 11a is rectangular as viewed from the open direction. This allows for the cleaning liquid to be discharged over a wide area while maintaining a high discharge pressure. Thus, the lens 5c may be cleaned in a further satisfactory manner.

(9) The fluid is formed by mixing the cleaning liquid (liquid) with air. Thus, in comparison with when the liquid is only the cleaning liquid (liquid), the discharge pressure may be increased (increase flow rate) to clean the lens 5c in a satisfactory manner. Further, the consumption amount of the cleaning liquid may be reduced.

(10) When the discharge port 11a is located at the non-cleaning position, the discharge port 11a is arranged only in a range extending downward from a position located sideward in the horizontal direction from the lens 5c, with the range including the position located sideward in the horizontal direction. In the first embodiment, when the discharge port 11a is located at the non-cleaning position, the discharge port 11a is arranged only at the position located sideward in the horizontal direction from the lens 5c. Thus, for example, even when liquid falls from the discharge port 11a that moves to the non-cleaning position after cleaning is performed, the fallen liquid does not collect on the lens 5c.

(11) The non-cleaning position is where the discharge port 11a is located outside the image capturing range of the on-board camera 5. The cleaning position is where the discharge port 11a is located inside the image capturing range of the on-board camera 5. Thus, by allowing the discharge port 11a to move to the cleaning position only when performing cleaning, the lens 5c may be cleaned in a satisfactory manner without obstructing image capturing.

Second Embodiment

A second embodiment of an on-board optical sensor cleaning device mounted on a vehicle will now be discussed with reference to FIGS. 6 to 8. In this example, the entire structure of the vehicle 1 is the same as the first embodiment. Thus, same reference numerals are given to those components that are the same as the corresponding components of the first embodiment. Such components will not be described in detail. The on-board camera 5 of this example includes a generally box-shaped main body 5a, which accommodates an image capturing element (not shown), a tube 5b, which extends from one surface of the main body 5a, and a lens 5c, which covers the distal end of the tube 5b and serves as an external image capturing surface.

Figure 6:
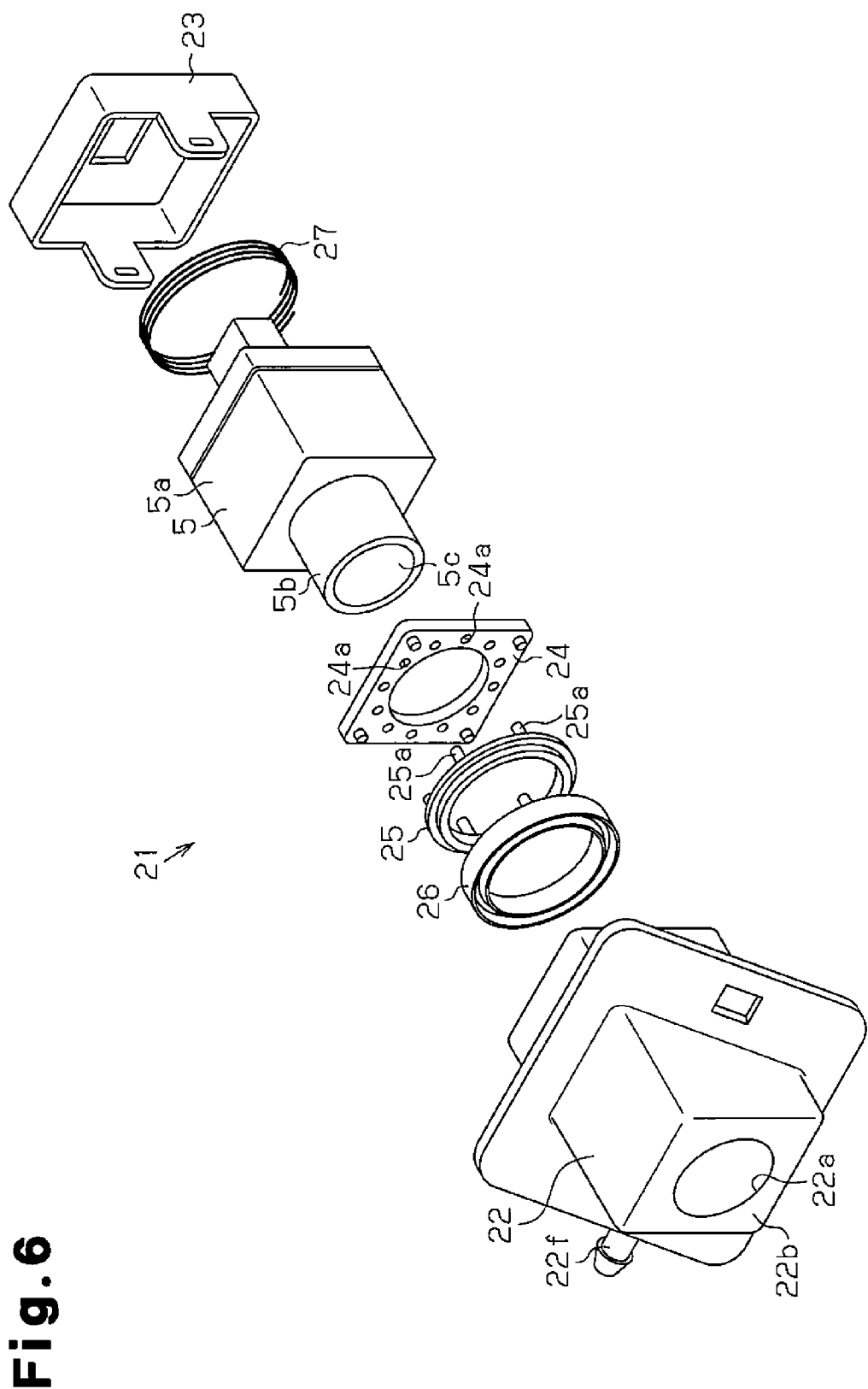
FIG. 6 is an exploded perspective view of a camera-incorporated cleaning unit according to a second embodiment of the present invention.

Referring to FIGS. 6 and 7, in the present embodiment, a camera-incorporated cleaning unit 21, which includes the on-board camera 5, is fixed to the back door 2.

The camera-incorporated cleaning unit 21 includes a generally box-shaped unit case 22 and a unit cap 23, which is fitted to and fixed to the basal portion of the unit case 22. The distal portion of the unit case 22 includes a circular opening 22a and a distal end wall 22b, which closes the distal portion of the unit case 22 excluding the opening 22a. The main body 5a is accommodated in a central portion of the unit case 22 so as to be able to move forward and rearward (leftward and rightward directions in FIGS. 7A and 7B). The lens 5c is movable out of and into the opening 22a when the main body 5a moves forward and rearward.

Figure 7A:
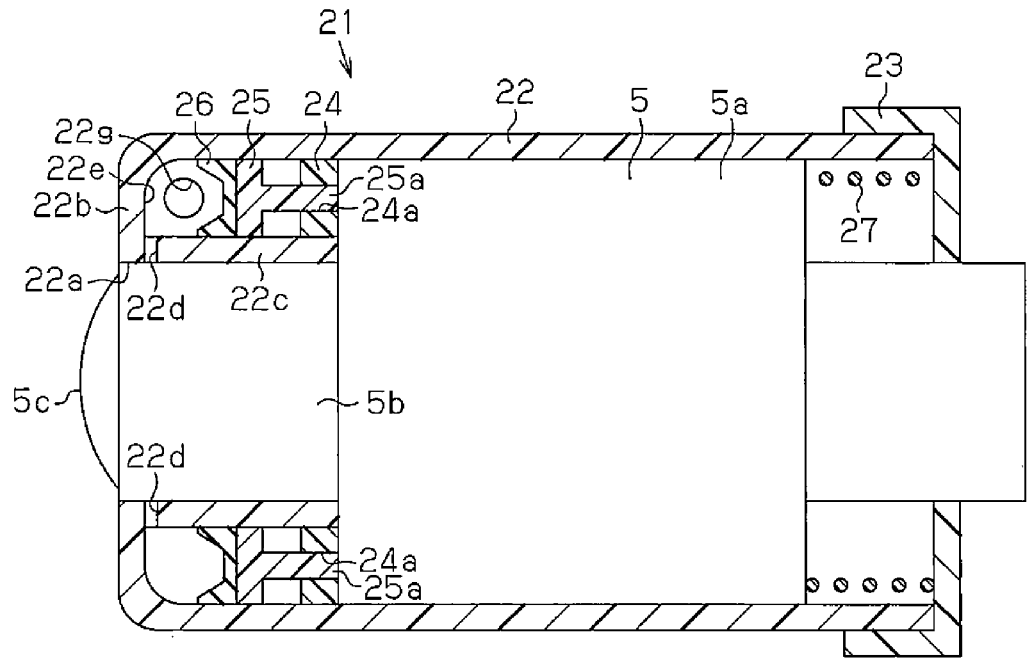
FIG. 7A is a cross-sectional view of the camera-incorporated cleaning unit shown in FIG. 6 at a non-cleaning position.
Figure 7B:
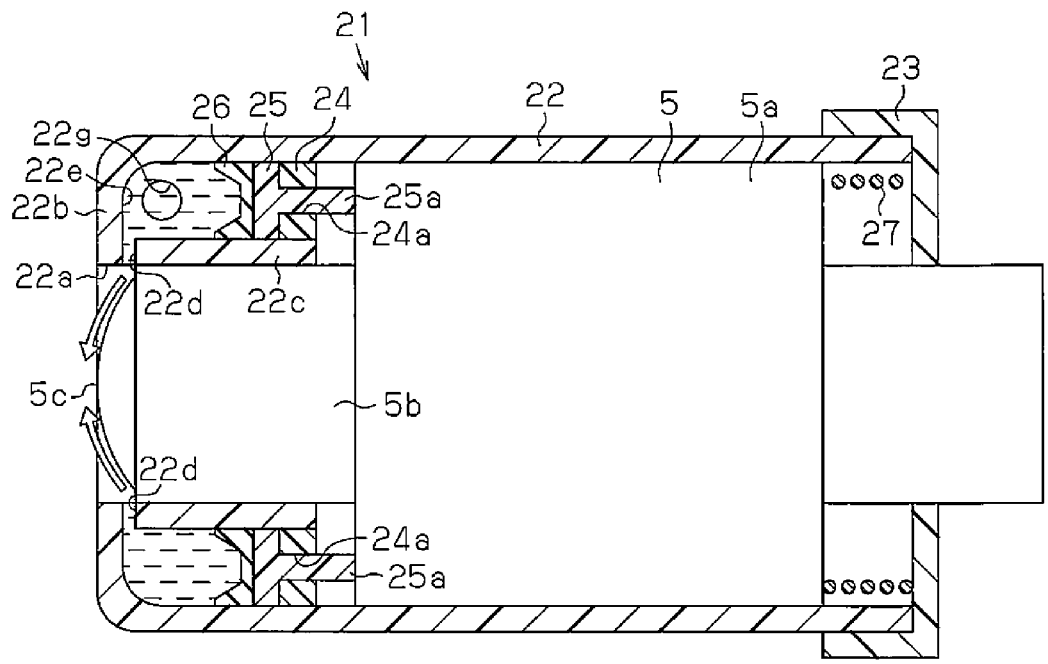
FIG. 7B is a cross-sectional view of the camera-incorporated cleaning unit shown in FIG. 6 at a cleaning position.

As shown in FIGS. 7A and 7B, the distal end wall 22b includes an inner tube 22c cylindrically extending from the rim of the opening 22a toward the inner side. The inner tube 22c has an inner diameter that is substantially the same as the outer diameter of the tube 5b of the on-board camera 5 (allowing the tube 5b to be fit and slide in the inner tube 22c). The inner tube 22c has a length in the axial direction (front to rear direction) that is set so that when the distal end of the inner tube 22c contacts the main body 5a of the on-board camera 5, the distal end of the tube 5b is flush with the outer surface of the distal end wall 22b and the lens 5c projects out of the distal end wall 22b.

Figure 8:
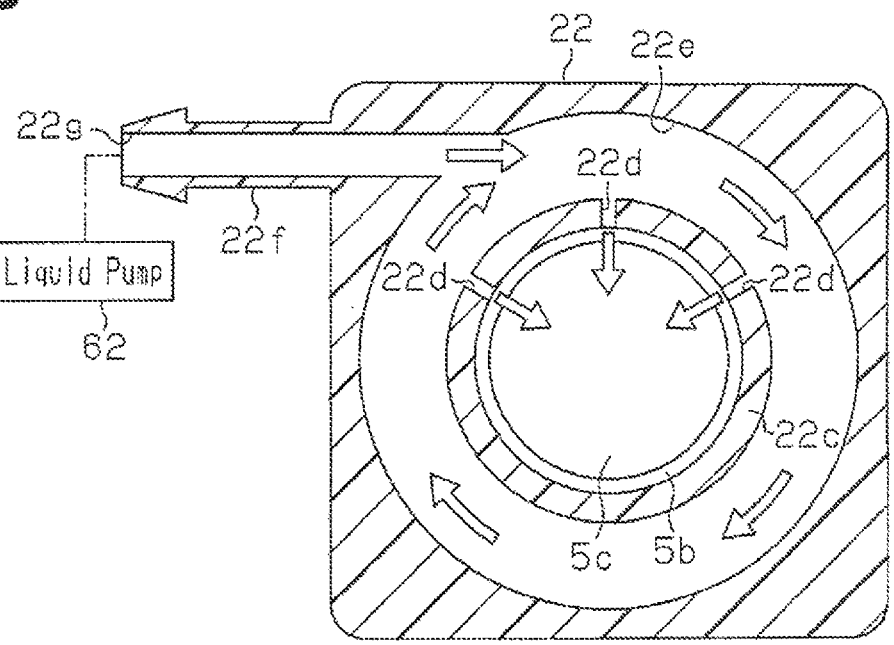
FIG. 8 is a cross-sectional view taken along a flow passage of the camera-incorporated cleaning unit shown in FIG. 6.

Further, as shown in FIGS. 7A to 8, a plurality of discharge ports extend in the radial direction through the basal portion of the inner tube 22c (left end as viewed in FIG. 7). In the present embodiment, the discharge ports 22d are arranged around the lens 5c as viewed from the axial direction (front to rear direction) of the inner tube 22c. The discharge direction of each discharge port 22d extends toward the central portion of the lens (i.e., inner side in the radial direction). Further, the discharge ports 22d are arranged so that their discharge directions do not extend toward one another.

More specifically, as shown in FIG. 8, the present embodiment includes three discharge ports 22d arranged at 60° intervals. FIGS. 7A and 7B show cross-sectional taken along a portion where the discharge ports 22d are formed and are illustrated as if the discharge ports 22d face each other (as if the discharge ports are formed in 180° intervals).

The distal portion of the unit case 22 includes an annular reservoir 22e located at the outer side (outer side in the radial direction) of the discharge ports 22d (inner tube 22c). A portion located at the outer side in the radial direction of the discharge ports 22d is in communication with the reservoir 22e to supply fluid (cleaning liquid) from the reservoir 22e to the discharge ports 22d. The distal portion of the unit case 22 has a circular inner surface so that the inner circumference and outer circumference of the reservoir 22e are circular and annular.

As shown in FIG. 8, an intake tube 22f projects from one side of the distal portion of the unit case 22. The inner side of the intake tube 22f serves as an intake port 22g. The reservoir 22e is in communication with the intake port 22g, and the reservoir 22e is supplied with fluid (cleaning liquid) from the intake port 22g. The intake port 22g of the present embodiment extends in the tangential direction of the annular reservoir 22e.

As shown in FIGS. 6 to 7B, the camera-incorporated cleaning unit 21 includes an auxiliary plate 24, a pushing member 25, a sealing member 26, and a compression coil spring 27, which serves as a biasing member.

The auxiliary plate 24 is annular and fixed so that the space between the outer circumference of the distal portion of the inner tube 22c (right end as viewed in FIG. 7) and the inner surface of the unit case 22 is filled with the auxiliary plate 24. Through holes 24a extend through the auxiliary plate 24 in the axial direction (front to rear direction).

The pushing member 25 is annular and accommodated in the reservoir 22e. The outer circumferential surface of the pushing member 25 is supported by the inner surface of the reservoir 22e so that the pushing member 25 can move forward and rearward in the reservoir 22e. Pushing projections 25a extend through the through holes 24a from the surface of the pushing member 25 facing the basal end of the unit case 22 in the pushing member 25 (surface of the pushing member 25 facing the unit cap 23) and move out of and into the through holes 24a when the pushing member 25 moves forward and rearward.

The sealing member 26 is fixed to the distal end surface of the pushing member 25 so as to slide while in contact with the inner circumferential surface of the reservoir 22e (i.e., outer circumferential surface of the inner tube 22c).

The compression coil spring 27 has one end supported by the unit cap 23 and another end in contact with the basal end of the main body 5a of the on-board camera 5. This biases the on-board camera 5 in the forward direction.

As shown in FIG. 8, the liquid pump 62 is connected to the intake tube 22f (intake port 22g). When the reservoir 22e is supplied with cleaning liquid from the intake port 22g, the delivery pressure of the cleaning liquid biases the distal surface of the pushing member 25 (sealing member 26). This moves the on-board camera 5 toward the rear with the pushing projections 25a against the biasing force of the compression coil spring 27.

Forward and rearward movement of the on-board camera 5 allows for movement of the lens 5c in the on-board optical sensor cleaning device between a cleaning position, which is located proximal to the image capturing range of the on-board camera 5, and a non-cleaning position, which is located farther from the image capturing range center than the cleaning position. The image capturing range is the range in which the on-board camera 5 (and its image capturing element) captures an image of a subject through the lens 5c.

In detail, in the present embodiment, the non-cleaning position is set at a position where the discharge ports 22d are located outside the image capturing range of the on-board camera 5 (outer side of the tube 5b). The cleaning position is set at a position where the discharge ports 22d are located inside the image capturing range of the on-board camera 5. Thus, when the on-board camera 5 (lens 5c) is moved toward the front to a front position, the lens 5c is located at the non-cleaning position where the discharge ports 22d are located outside the image capturing range. When the on-board camera 5 (lens 5c) is moved toward the rear to a rear position, the lens 5c is located at the cleaning position where the discharge ports 22d are located in the image capturing range.

The movement and operation of the on-board optical sensor cleaning device in the present embodiment will now be described.

When the liquid pump 62 is not driven, due to the biasing force of the compression coil spring 27, the on-board camera 5 (lens 5*c*) is located at the front position (refer to FIG. 7A). Thus, the discharge ports 22*d* are located outside the image capturing range of the on-board camera 5. As a result, if an image is captured when cleaning is not performed, the discharge ports 22*d* do not obstruct the image capturing.

When the liquid pump 62 is driven and the cleaning liquid is supplied from the intake port 22*g* to the reservoir 22*e*, the delivery pressure of the cleaning liquid moves the on-board camera (lens 5*c*) toward the rear to the cleaning position (refer to FIG. 7B). Thus, the discharge ports 22*d* are located in the image capturing range of the on-board camera 5, and the cleaning liquid is discharged from the discharge ports 22*d* to the lens 5*c*. This removes foreign matter or the like from the lens 5*c* and performs satisfactory cleaning.

The advantages of the second embodiment will now be described.

(1) The lens 5*c* and the discharge ports 11*a* are relatively movable. In the second embodiment, the lens 5*c* is movable relative to the discharge ports 22*d*. The on-board camera 5 includes the lens 5*c*. The lens 5*c* is movable between the cleaning position, in which the discharge ports 22*d* are located proximal to the image capturing range center of the on-board camera 5, and the non-cleaning position, in which the discharge ports 22*d* are located farther from the image capturing range center than the cleaning position. Thus, by allowing the lens 5*c* to move to the cleaning position only when performing cleaning, the lens 5*c* may be cleaned in a satisfactory manner without obstructing image capturing.

(2) The on-board camera 5 includes the lens 5*c*. The lens 5*c* is moveable in forward and rearward directions between the cleaning position and the non-cleaning position. This reduces the area required for the movement compared to, for example, when relatively pivoting the external image capturing surface (lens 5*c*) and the discharge port 11*a*.

(3) The on-board camera 5, which includes the lens 5*c*, is fixed to the vehicle 1. The lens 5*c* (on-board camera 5) is moveable in forward and rearward directions relative to the vehicle 1. Thus, compared to a structure that enables movement of the discharge ports (structure of the first embodiment), fluid may be stably discharged from the discharge ports 22*d*.

(4) The delivery pressure of the cleaning liquid (fluid) moves the on-board camera 5, which includes the lens 5*c*, rearward to the cleaning position. Thus, there is no need for an electric driving device or the like to move the lens 5*c* (on-board camera 5) rearward. This allows for a simplified structure.

(5) The cleaning device of the present embodiment includes the compression coil spring 27 (biasing member). The biasing force of the compression coil spring 27 moves the on-board camera 5, which includes the lens 5*c*, forward to the non-cleaning position. Thus, there is no need for an electric driving device or the like to move the lens 5*c* (on-board camera 5) forward. This allows for a simplified structure.

(6) The discharge port 22*d* is one of a plurality of discharge ports 22*d*. This allows for further satisfactory cleaning of the lens 5*c*.

(7) The discharge ports 22*d* are arranged around the lens 5*c*. The discharge ports 22*d* are arranged so that the discharge direction of the discharge ports 22*d* extends toward the central portion of the lens 5*c*. Thus, fluid is discharged toward the central portion of the lens 5*c* from directions around the lens 5*c*. This allows for further satisfactory cleaning of the lens 5*c*.

(8) The discharge ports 22*d* are arranged so that their discharge directions do not extend toward one another. This avoids head-on striking of the discharged cleaning liquid (fluid) and allows for further satisfactory cleaning of the lens 5*c*.

(9) The discharge ports 22*d* are in communication with the annular reservoir 22*e*, and the discharge ports 22*d* are supplied with cleaning liquid (fluid) from the reservoir 22*e*. The reservoir 22*e* is supplied with the cleaning liquid from the intake port 22*g*, which extends in the tangential direction of the reservoir 22*e*. Thus, in comparison with when, for example, the reservoir 22*e* is supplied with the cleaning liquid in a direction orthogonal to a tangent, the cleaning liquid may be uniformly discharged from the discharge ports 22*d*. In a structure in which the cleaning liquid is supplied to the reservoir 22*e* in a direction orthogonal to a tangent, the flow of cleaning liquid in the annular reservoir 22*e* may be disturbed. This may disturb the amount and force of the cleaning liquid discharged from each discharge port 22*d*. However, the present embodiment suppresses such a situation, and the cleaning liquid may be discharged at a generally uniform amount with a generally uniform force from each discharge port 22*d*.

(10) The non-cleaning position is where the discharge ports 22*d* are located outside the image capturing range of the on-board camera 5. The cleaning position is where the discharge ports 22*d* are located inside the image capturing range of the on-board camera 5. Thus, by allowing for movement of the lens 5*c* (on-board camera 5) to the cleaning position only when performing cleaning, the lens 5*c* may be cleaned in a satisfactory manner without obstructing image capturing.

The above embodiments may be modified in the following manner.

In the second embodiment, the discharge ports 22*d* are arranged so that the discharge directions of the discharge ports 22*d* do not extend toward one another. Instead, the discharge ports 22*d* may be arranged so that the discharge directions of the discharge ports 22*d* extend toward one another.

Figure 9:
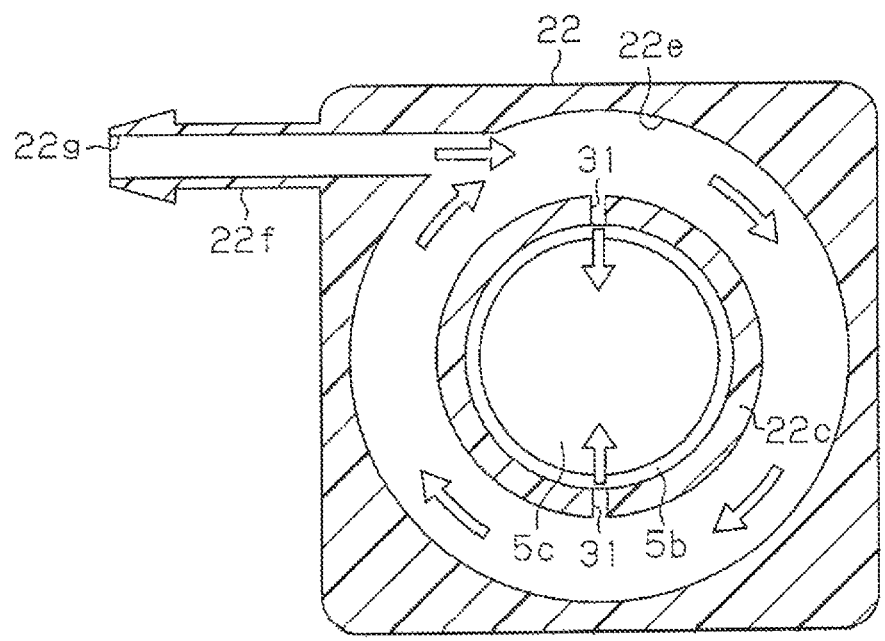
FIG. 9 is a cross-sectional view taken along a flow passage of a camera-incorporated cleaning unit in a further example.

For example, as shown in FIG. 9, discharge ports 31 may be arranged at 180° around the entire lens 5*c* as viewed in the axial direction.

Figure 10:
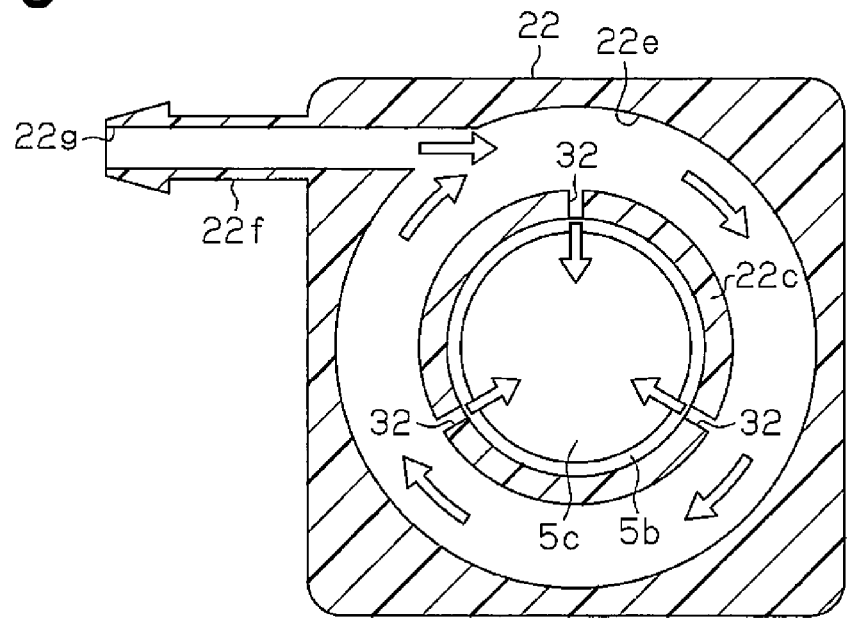
FIG. 10 is a cross-sectional view taken along a flow passage of a camera-incorporated cleaning unit in a further example.

Further, for example, as shown in FIG. 10, discharge ports 32 may be arranged at 120° intervals around the entire lens 5*c* as viewed in the axial direction.

Figure 11:
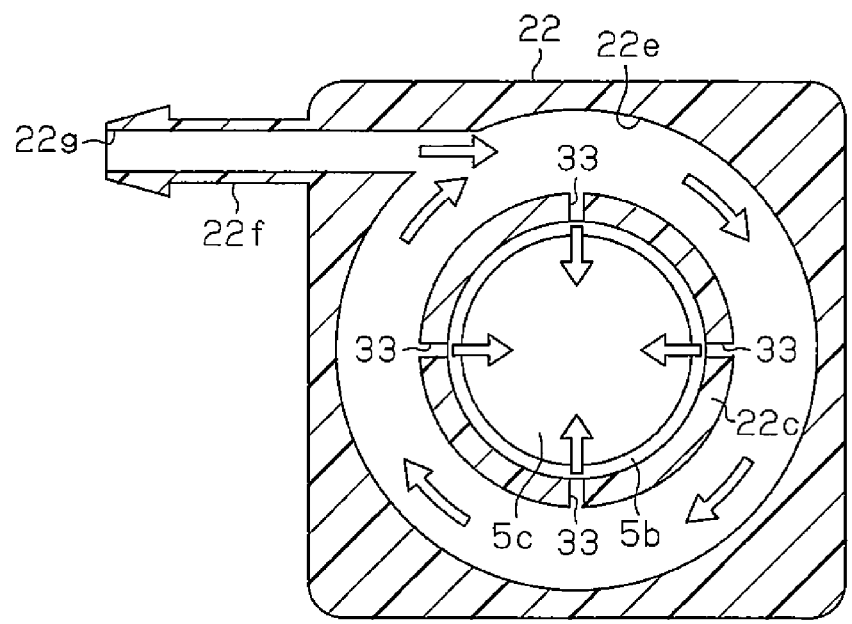
FIG. 11 is a cross-sectional view taken along a flow passage of a camera-incorporated cleaning unit in a further example.

Further, for example, as shown in FIG. 11, discharge ports 33 may be arranged at 90° intervals around the entire lens 5*c* as viewed in the axial direction.

In these cases, the discharge ports 31 to 33 are arranged at equal angular intervals around the entire lens 5*c*. This allows for uniform cleaning of the lens 5*c*.

In each of the above embodiments, the delivery force of the cleaning liquid (fluid) and the biasing force of the compression coil springs 12 and 27 (biasing members) are used to move the discharge ports 11*a* and 22*d* or the lens 5*c*. This may be changed to a different drive force.

Figure 12:
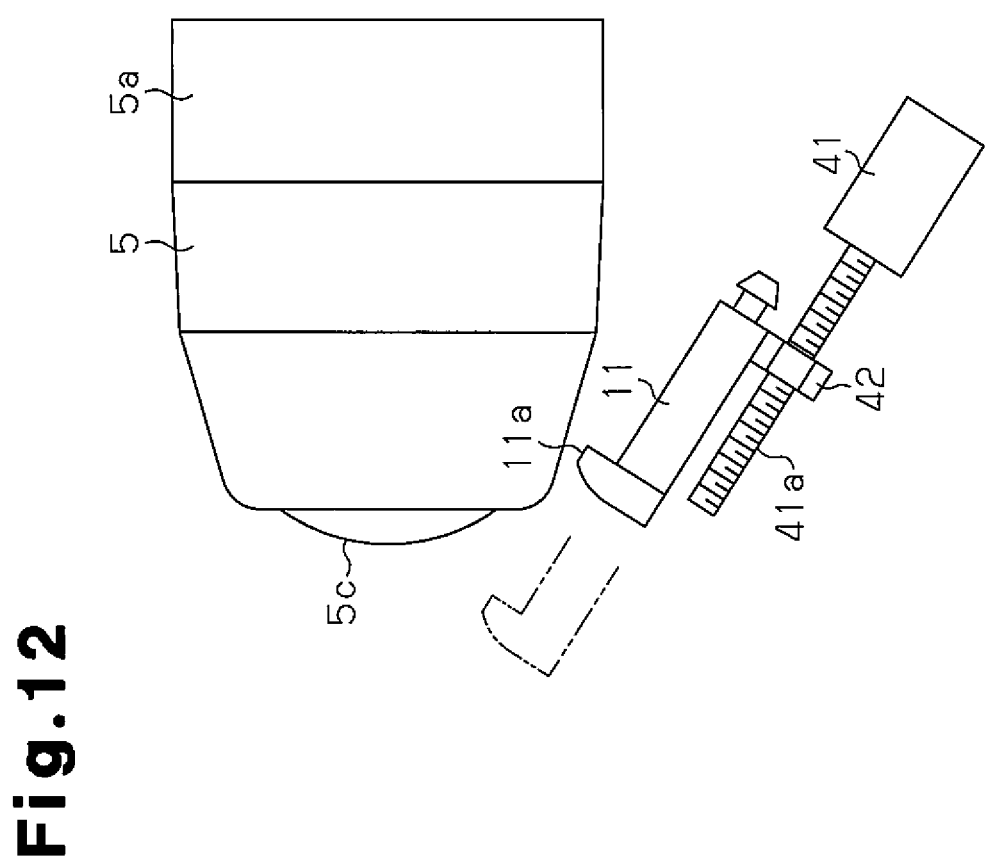
FIG. 12 is a schematic diagram of an on-board optical sensor cleaning device in a further example.

For example, the structure of the first embodiment may be changed as shown in FIG. 12. In this example, at least one of the lens 5*c* and the discharge port 11*a* is moved by the drive force of an electric motor 41, which serves as an electric drive device. Specifically, in this example, the on-board camera 5, which includes the lens 5*c*, is fixed to the vehicle. A nut 42 including a female thread is fixed to the movable nozzle 11, which includes the discharge port 11a. The movable nozzle 11 and the nut 42 are supported by a support (not shown) so that rotation is disabled relative to the support. A rotation shaft 41a of the electric motor 41 includes a male thread, and the male thread is fastened with the nut 42 (female thread). When the rotation shaft 41a of the electric motor 41 is rotated and driven, the nut 42 cannot be rotated. Thus, the movable nozzle 11 moves together with the nut 42 between the cleaning position and the non-cleaning position.

In this case, the drive force of the electric motor 41 moves the discharge port 11a (movable nozzle 11) relative to the lens 5c. Thus, for example, in comparison with a structure that moves the discharge port 11a with the delivery pressure of fluid, position control may be executed with further accuracy.

In each of the above embodiments, the lens 5c or the discharge ports 11a and 22d are able to move forward and rearward between the cleaning position and the non-cleaning position. Instead, for example, the lens 5c or the discharge ports 11a and 22d may be moved between the cleaning position and the non-cleaning position in directions other than the forward and rearward directions.

The discharge port 11a (movable nozzle 11) is moved in the first embodiment, and the lens 5c (on-board camera 5) is moved in the second embodiment. Instead, the discharge port and the lens may both be moved.

In each of the above embodiments, the non-cleaning position is located where the discharge ports 11a and 22d are outside the image capturing range of the on-board camera 5, and the cleaning position is located where the discharge ports 11a and 22d are inside the image capturing range of the on-board camera 5. However, as long as the non-cleaning position is located farther from the capturing image range center X than the cleaning position, the non-cleaning position may be changed. For example, the non-cleaning position may be located in the image capturing range at the edge of the image capturing range to slightly include the discharge ports 11a and 22d. When setting the non-cleaning position at such a location, by allowing for movement to the cleaning position only when performing cleaning, the lens 5c may be cleaned in a satisfactory manner without substantially obstructing image capturing.

In the first embodiment, the direction in which the movable nozzle 11 (discharge port 11a) is able to move forward and rearward is inclined relative to the direction the lens 5c of the on-board camera 5 faces (center axis of the lens 5c that is the image capturing axis coinciding with the image capturing range center X). For example, the forward and rearward movable directions may be parallel to the direction the lens 5c of the on-board camera 5 faces. In other words, in the first embodiment, the movable nozzle 11 is movable in the forward direction so that the discharge port 11a approaches the image capturing axis (center axis of lens 5c). Instead, the movable nozzle 11 may be moved forward along the image capturing axis (so that the discharge port 11a does not approach the image capturing axis).

For example, the structure of the first embodiment may be changed as shown in FIG. 13A. In this example, the forward and rearward directions in which the discharge port 11a is movable coincide with the image capturing axis Xa that coincides with the image capturing range center X.

Further, in this example, the range (angle) Y is 180° for the image captured with the on-board camera 5 (image capturing element) through the lens 5c.

The non-cleaning position (position A) of the discharge port 11a is set at the edge of the image capturing range, and the cleaning position (position B) of the discharge port 11a is set at an intermediate point between the image capturing range center X and the edge of the image capturing range. More specifically, as shown in FIG. 13B, the non-cleaning position (position A) is located where the discharge port 11a (distal portion of movable nozzle 11) is shown at the edge of the display 60. As shown in FIG. 13C, the cleaning position (position B) is located at an intermediate point between the edge of the display 60 and the image capturing range center X. In this example, the distance from the lens 5c to the discharge port 11a is longer at the cleaning position (position B) but closer to the image capturing range center X at the cleaning position. More specifically, the cleaning position (position B), which is proximal to the image capturing center axis X, and the non-cleaning position (position A), which is farther from the image capturing range center X than the cleaning position, relates to the inclination angles θa and θb from the image capturing axis Xa regardless of the distance from the lens 5c. A location where the inclination angles θa and θb are small (position of inclination angle θb) is the cleaning position proximal to the image capturing range center X.

For example, the structure of the first embodiment may be changed as shown in FIG. 14A. In this example, the directions in which the discharge port 11a is movable forward and rearward are parallel to the image capturing axis Xa that coincides with the image capturing range center X.

Further, in this example, the range (angle) Z is 90° for the image captured with the on-board camera 5 through the lens 5c.

The non-cleaning position (position C) of the discharge port 11a is set at the edge of the image capturing range, and the cleaning position (position D) of the discharge port 11a is set at an intermediate point between the image capturing range center X and the edge of the image capturing range. More specifically, as shown in FIG. 14B, the non-cleaning position (position C) is located where the discharge port 11a (distal portion of movable nozzle 11) is shown at the edge of the display 60. As shown in FIG. 14C, the cleaning position (position D) is located at an intermediate point between the edge of the display 60 and the image capturing range center X. In this example, the distance from the lens 5c to the discharge port 11a is longer at the cleaning position (position D) but closer to the image capturing range center X at the cleaning position. More specifically, the cleaning position (position D), which is proximal to the image capturing center axis X, and the non-cleaning position (position C), which is farther from the image capturing range center X than the cleaning position, relates to the inclination angles θc and θd from the image capturing axis Xa regardless of the distance from the lens 5c. A location where the inclination angles θc and θd are small (position of inclination angle θd) is the cleaning position proximal to the image capturing range center X.

As shown in FIG. 14A, the non-cleaning position (position E) of the discharge port 11a may of course be set outside the image capturing range. In this case, as shown by the double-dashed lines in FIG. 14B, the non-cleaning position (position E) may be located where the discharge port 11a (distal portion of movable nozzle 11) is not shown on the display 60.

Figure 15A:
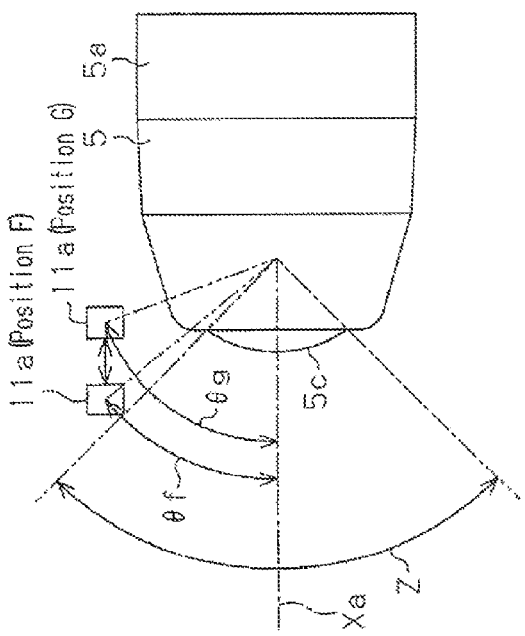
FIG. 15A is a schematic diagram of an on-board optical sensor cleaning device in a further example.

For example, the structure of the first embodiment may be changed as shown in FIG. 15A. In this example, the directions in which the discharge port 11a is able to move forward and rearward are parallel to the image capturing axis Xa that coincides with the image capturing axis X.

Further, in this example, the image capturing range (angle) Z of the on-board camera 5 through the lens 5c is 90°.

Figure 15B:
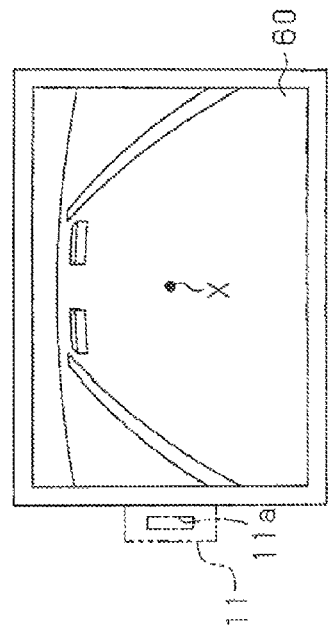
FIGS. 15B and 15C are schematic views each showing a display in a further example.
Figure 15C:
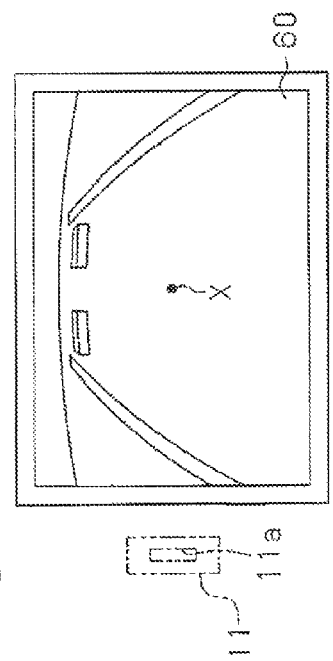

The cleaning position (position F) of the discharge port 11a is set proximal to the image capturing range center X although outside the image capturing range (refer to FIG. 15C), and the non-cleaning position (position G) of the discharge port 11a is set at a location farther from the image capturing range center X than the cleaning position (position F) although outside the image capturing range (refer to FIG. 15B). More specifically, the inclination angle θf from the image capturing axis Xa at the cleaning position (position F) is set to be smaller than the inclination angle θg from the image capturing axis Xa at the non-cleaning position (position G). In this case, the discharge port 11a does not obstruct image capturing regardless of whether or not cleaning is performed, and the lens 5c may be cleaned in a satisfactory manner. Further, except when performing cleaning, the discharge port 11a is moved (rearward) to the non-cleaning position. This improves the aesthetic appeal when cleaning is not performed. In other examples, the discharge port 11a may, of course, be moved (rearward) to the non-cleaning position when cleaning is not performed to improve the aesthetic appeal.

In each of the above embodiments, the biasing members are the compression coil springs 12 and 27. However, as long as the same function can be provided, for example, the compression coil springs 12 and 27 may be changed to other biasing members such as tensile springs or torsion coil springs.

In each of the above embodiments, the on-board optical sensor is the on-board camera 5 that captures images at the rear of the vehicle. Instead, for example, the on-board optical sensor may be an on-board camera that captures images in other directions of the vehicle 1 or a rain sensor in which a CPU or the like recognizes the rain amount based on captured images.

In the first embodiment, the fluid that cleans the lens 5c is a fluid in which a cleaning liquid (liquid) is mixed with air. Instead, the fluid may be another fluid such as only a cleaning liquid or only air. Further, in the second embodiment, the fluid is a cleaning liquid. Instead, the fluid may be another fluid such as air or a fluid in which a cleaning liquid is mixed with air.

Figure 16:
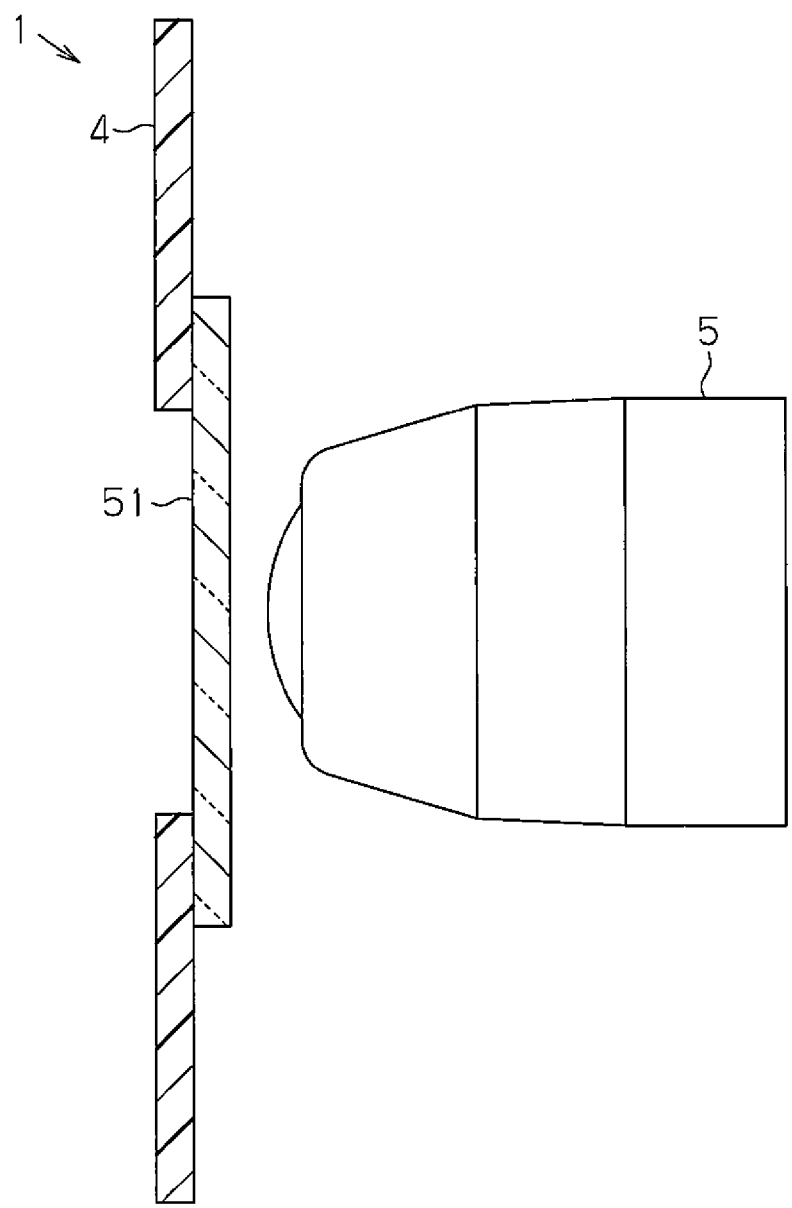
FIG. 16 is a partially cross-sectional view showing a protective glass in a further example.

In the first embodiment, the external image capturing surface is the lens 5c of the on-board camera 5. Instead, the external image capturing surface may be a transparent plate (glass or plastic) directly fixed to the vehicle (garnish or the like) and formed separately from the on-board camera. In other words, the present invention may be embodied in an on-board optical sensor cleaning device that removes foreign material from the transparent plate. In the first embodiment, the on-board camera 5, which includes the lens 5c, is fixed to the vehicle 1 so that the external image capturing surface is immovable relative to the vehicle 1. For example, as shown in FIG. 16, a protective glass 51, which is a transparent plate, may be directly fixed to the vehicle 1 (garnish 4) so that the external image capturing surface (protective glass 51) is immovable relative to the vehicle 1.

Figure 17:
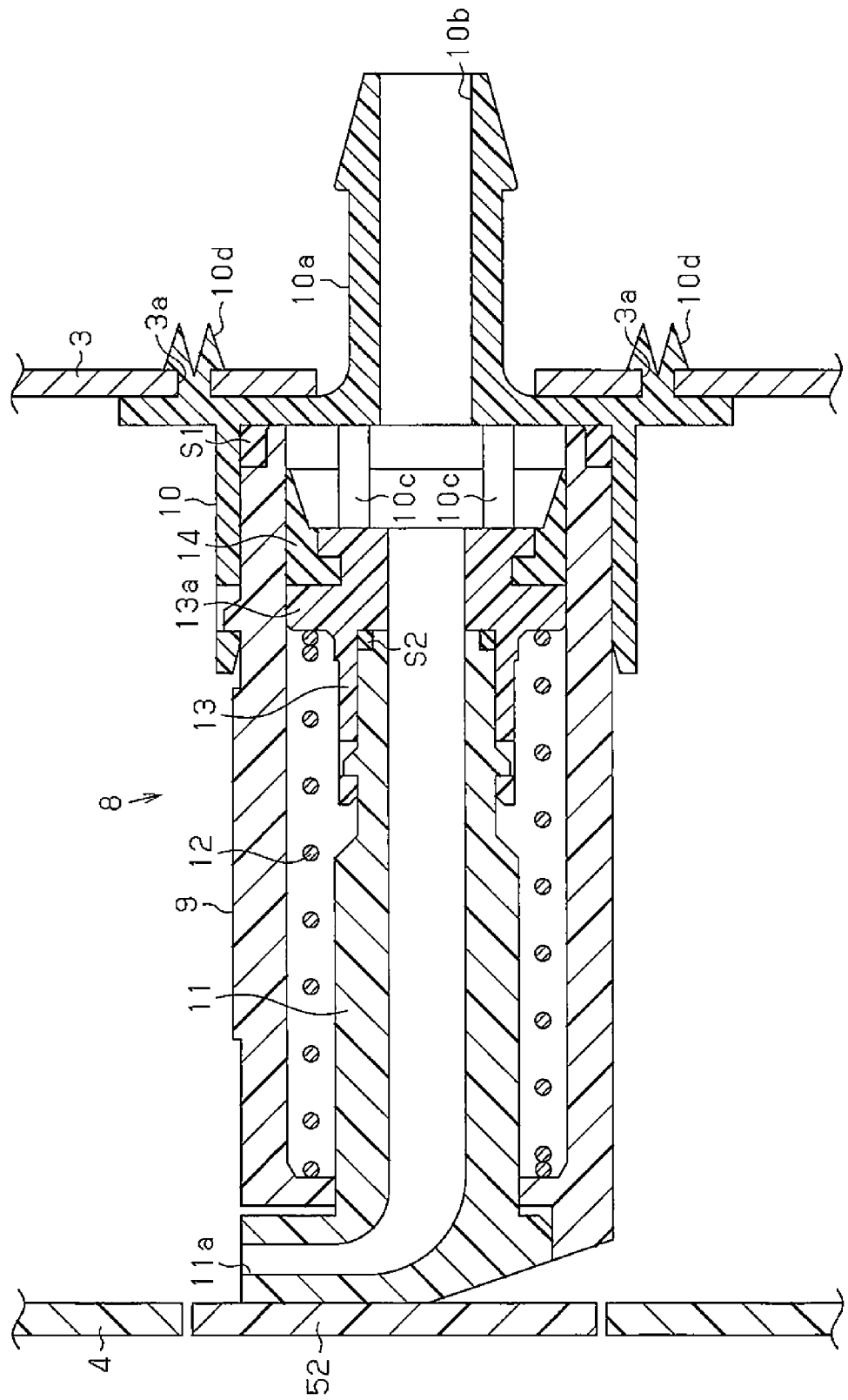
FIG. 17 is a cross-sectional view showing a fastening structure of a nozzle unit in a further example.

In the first embodiment, the movable nozzle 11 that includes the discharge port 11a is a structure supported to be able to move forward and rearward relative to the on-board camera 5 fixed to the vehicle 1. However, the movable nozzle 11 may have another structure as long as it is movable relative to the vehicle 1 in forward and rearward directions. For example, the structure of the first embodiment may be changed as shown in FIG. 17. In FIG. 17, the second case 10 of the nozzle unit 8 includes snap-fit portions 10d. The snap-fit portions 10d are fitted to fitting portions 3a of the vehicle panel 3. In this manner, the nozzle unit 8 is coupled in a removable manner to the vehicle 1. In this example (refer to FIG. 17), a lid 52 is arranged on the distal end of the movable nozzle 11. The outer surface of the lid 52 and the outer surface of the garnish 4 have the same color. When the movable nozzle 11 is moved rearward to the rear position, the lid 52 closes the opening of the garnish 4, and the outer surface of the garnish 4 is flush with the outer surface of the lid 52. In the first embodiment, the nozzle unit 8, in which the movable nozzle 11 is able to move forward and rearward, is coupled in a removable manner to the vehicle 1 (specifically, the on-board camera 5). Instead, the nozzle unit 8 may be coupled in a non-removable manner to the vehicle 1.

In the first embodiment, the discharge port 11a is rectangular as viewed in the open direction. Instead, for example, the discharge port 11a may be square or circular as viewed from the open direction.

In the first embodiment, the discharge port 11a is located sideward in the horizontal direction from the lens 5c at the non-cleaning position but may be located at other positions. For example, the discharge port 11a may be located only in a range extending downward from a position located sideward in the horizontal direction from the lens 5c (external image capturing surface) at the non-cleaning position. In such a structure, even when liquid falls from the discharge port 11a that moves to the non-cleaning position after cleaning is performed, the fallen liquid does not collect on the lens 5c. Further, for example, the discharge port 11a may be located in a range extending upward from a position located sideward in the horizontal direction from the lens 5c (external image capturing surface) at the non-cleaning position.

The invention claimed is:

1. An on-board optical sensor cleaning device comprising:
    an on-board optical sensor mounted on a vehicle, wherein the on-board optical sensor includes an external image capturing surface; and
    a discharge port that discharges fluid toward the external image capturing surface, wherein the discharged fluid removes foreign material on the external image capturing surface, wherein the external image capturing surface is immovable relative to the vehicle, the discharge port is movable relative to the external image capturing surface, the discharge port is located in a movable nozzle that is supported to be able to move forward and rearward in a movement direction of the movable nozzle relative to the vehicle, the discharge port is movable between a cleaning position, wherein the discharge port is located proximal to a center of an image capturing range of the on-board optical sensor, and a non-cleaning position, wherein the discharge port is located farther from the center of the image capturing range than the cleaning position, wherein the image capturing range is a range in which the on-board optical sensor captures images through the external image capturing surface and is the range shown on a display, and the movable nozzle is movable forward and rearward between the cleaning position and the non-cleaning position along a direction inclined relative to a center axis of the on-board optical sensor.

2. The on-board optical sensor cleaning device according to claim 1, wherein the movable nozzle is able to move forward so that the discharge port approaches an image capturing axis of the on-board optical sensor.

3. The on-board optical sensor cleaning device according to claim 1, wherein the movable nozzle is moved forward to the cleaning position by a delivery pressure of the fluid.

4. The on-board optical sensor cleaning device according to claim 1, further comprising a biasing member, wherein the movable nozzle is moved rearward to the non-cleaning position by a biasing force of the biasing member.

5. The on-board optical sensor cleaning device according to claim 1, further comprising a nozzle unit that supports the movable nozzle to be able to move forward and rearward, wherein the nozzle unit is coupled in a removable manner to the vehicle.

6. The on-board optical sensor cleaning device according to claim 1, wherein the discharge port is formed to be elongated rectangular as viewed from an open direction.

7. The on-board optical sensor cleaning device according to claim 1, wherein the fluid is formed by mixing liquid and air.

8. The on-board optical sensor cleaning device according to claim 1, wherein the fluid includes liquid, and when the discharge port is located at the non-cleaning position, the discharge port is located only in a range extending downward from a position located sideward in a horizontal direction from the external image capturing surface including the position located sideward in the horizontal direction.

9. The on-board optical sensor cleaning device according to claim 1, wherein the non-cleaning position is where the discharge port is located outside an image capturing range of the on-board optical sensor, and the cleaning position is where the discharge port is located inside the image capturing range of the on-board optical sensor.

10. The on-board optical sensor cleaning device according to claim 1, wherein the discharge port is moved by a drive force of an electric driving device.

11. An on-board optical sensor cleaning device comprising:
an on-board optical sensor mounted on a vehicle, wherein the on-board optical sensor includes an external image capturing surface; and
a discharge port that discharges fluid toward the external image capturing surface, wherein the discharged fluid removes foreign material on the external image capturing surface, wherein the external image capturing surface is immovable relative to the vehicle, the discharge port is movable relative to the external image capturing surface, the discharge port is located in a movable nozzle that is supported to be able to move forward and rearward in a movement direction of the movable nozzle relative to the vehicle, the discharge port is movable between a cleaning position, wherein the discharge port is located proximal to a center of an image capturing range of the on-board optical sensor, and a non-cleaning position, wherein the discharge port is located farther from the center of the image capturing range than the cleaning position, wherein the image capturing range is a range in which the on-board optical sensor captures images through the external image capturing surface and is the range shown on a display, and the discharge port of the movable nozzle is located outside the image capturing range of the on-board optical sensor when the discharge port is in the non-cleaning position and is located inside the image capturing range of the on-board optical sensor when the discharge port is in the cleaning position.

12. The on-board optical sensor cleaning device according to claim 11, wherein the movable nozzle is able to move forward so that the discharge port approaches an image capturing axis of the on-board optical sensor.

13. The on-board optical sensor cleaning device according to claim 11, wherein the movable nozzle is moved forward to the cleaning position by a delivery pressure of the fluid.

14. The on-board optical sensor cleaning device according to claim 11, further comprising a nozzle unit that supports the movable nozzle to be able to move forward and rearward, wherein the nozzle unit is coupled in a removable manner to the vehicle.

15. The on-board optical sensor cleaning device according to claim 11, wherein the fluid is formed by mixing liquid and air.

16. The on-board optical sensor cleaning device according to claim 11, wherein the fluid includes liquid, and when the discharge port is located at the non-cleaning position, the discharge port is located only in a range extending downward from a position located sideward in a horizontal direction from the external image capturing surface including the position located sideward in the horizontal direction.

17. The on-board optical sensor cleaning device according to claim 11, wherein the discharge port is moved by a drive force of an electric driving device.

18. An on-board optical sensor cleaning device comprising:
an on-board optical sensor mounted on a vehicle, wherein the on-board optical sensor includes an external image capturing surface;
a discharge port that discharges fluid toward the external image capturing surface, wherein the discharged fluid removes foreign material on the external image capturing surface; and
a biasing member, wherein the external image capturing surface and the discharge port are relatively movable, at least one of the external image capturing surface and the discharge port is movable between a cleaning position, wherein the discharge port is located proximal to a center of an image capturing range of the on-board optical sensor, and a non-cleaning position, wherein the discharge port is located farther from the center of the image capturing range than the cleaning position, wherein the image capturing range is a range in which the on-board optical sensor captures images through the external image capturing surface and is the range shown on a display, and at least one of the external image capturing surface and the discharge port is biased toward the non-cleaning position by a biasing force of the biasing member.

19. The on-board optical sensor cleaning device according to claim 18, wherein the discharge port is fixed to the vehicle, and the external image capturing surface is able to move in forward and rearward directions relative to the vehicle.

20. The on-board optical sensor cleaning device according to claim 19, wherein the external image capturing surface is moved rearward to the cleaning position by a delivery pressure of the fluid.

21. The on-board optical sensor cleaning device according to claim 19, wherein the discharge port is one of a plurality of discharge ports.

22. The on-board optical sensor cleaning device according to claim 21, wherein the discharge ports are arranged around the external image capturing surface; and the discharge ports are arranged so that discharge directions of the discharge ports extend toward a central portion of the external image capturing surface.

23. The on-board optical sensor cleaning device according to claim 21, wherein the discharge ports are arranged so that discharge directions of the discharge ports do not extend toward each other.

24. The on-board optical sensor cleaning device according to claim 21, wherein the discharge ports are arranged at equal angular intervals around the entire external image capturing surface.

25. The on-board optical sensor cleaning device according to claim 21, further comprising an annular reservoir in communication with the discharge ports, and an intake port extending in a tangential direction of the reservoir, wherein the fluid is supplied from the intake port to the reservoir, and the fluid is supplied from the reservoir to the discharge ports.

26. An on-board optical sensor cleaning device comprising:
   an on-board optical sensor mounted on a vehicle, wherein the on-board optical sensor includes an external image capturing surface; and
   a discharge port that discharges fluid toward the external image capturing surface, wherein the discharged fluid removes foreign material on the external image capturing surface, wherein the external image capturing surface is immovable relative to the vehicle, the discharge port is movable relative to the external image capturing surface, the discharge port is located in a movable nozzle that is supported to be able to move forward and rearward in a movement direction of the movable nozzle relative to the vehicle, the discharge port is movable between a cleaning position, wherein the discharge port is located proximal to a center of an image capturing range of the on-board optical sensor, and a non-cleaning position, wherein the discharge port is located farther from the center of the image capturing range than the cleaning position, wherein the image capturing range is a range in which the on-board optical sensor captures images through the external image capturing surface and is the range shown on a display, and the on-board optical sensor further comprising a nozzle unit that includes a tubular case having a distal opening, wherein the tubular case supports the movable nozzle to be able to move forward and rearward between the cleaning position and the non-cleaning position along an imaginary straight line, the movable nozzle moves out of and into the distal opening of the tubular case.

* * * * *